United States Patent [19]
Yokoi

[11] 3,921,767
[45] Nov. 25, 1975

[54] WHEEL CYLINDER IN A DUAL HYDRAULIC BRAKE SYSTEM OF A VEHICLE

[75] Inventor: Masatada Yokoi, Toyota, Japan

[73] Assignee: Aisin Seiki Kabushiki Kaisha, Kariya, Japan

[22] Filed: Feb. 14, 1974

[21] Appl. No.: 442,579

Related U.S. Application Data

[63] Continuation of Ser. No. 234,144, March 13, 1972, abandoned.

[52] U.S. Cl. .................. 188/345; 92/75; 188/72.5; 188/364
[51] Int. Cl.² .......................................... F16D 65/14
[58] Field of Search ....... 188/72.5, 106 P, 345, 364, 188/370; 92/75

[56] References Cited
UNITED STATES PATENTS

| | | | |
|---|---|---|---|
| 3,403,602 | 10/1968 | Brandon, Jr. | 188/345 X |
| 3,601,233 | 8/1971 | Marschall et al. | 188/345 |
| 3,707,210 | 12/1972 | Nyunoya et al. | 188/345 |

FOREIGN PATENTS OR APPLICATIONS

| | | | |
|---|---|---|---|
| 1,338,610 | 8/1963 | France | 188/370 |
| 1,462,082 | 11/1966 | France | 188/364 |

Primary Examiner—George E. A. Halvosa
Attorney, Agent, or Firm—Oblon, Fisher, Spivak, McClelland & Maier

[57] ABSTRACT

A wheel cylinder in a dual hydraulic brake system in which, in the event of hydraulic failure of one hyraulic circuit, the other will still function, comprising a cylinder housing having two pistons slidably fitted therein and two independent fluid chambers constituted therebetween, wherein each of the pistons and the cylinder housing are provided with overlapping oil-tight sliding portions thereon, the overlapped portion of the cylinder housing being formed integrally with the remaining portion thereof, whereby no sealing means are required between the overlapped portion and the remaining portion.

8 Claims, 3 Drawing Figures

WHEEL CYLINDER IN A DUAL HYDRAULIC BRAKE SYSTEM OF A VEHICLE

This is a continuation of application Ser. No. 234,144, filed Mar. 13, 1972, now abandoned.

BACKGROUND OF THE INVENTION

1. Field of the Invention

The present invention relates generally to a wheel cylinder in a hydraulic brake system of a vehicle and more particularly to a wheel cylinder in a dual brake system having two independent hydraulic circuits for separate brakes, such as the front and rear brakes of an automobile.

2. Description of the Prior Art

As for a wheel cylinder for a dual brake system, the so-called rigid type wheel cylinder is well-known in which two pressure chambers are independently provided, each of which being arranged for each respective hydraulic circuit so as to eliminate an oil loss when hydraulic failure occurs in either one of the hydraulic circuits. Meanwhile, since it is necessary to compensate for a worn quantity of a friction pad or a brake shoe lining, conventionally two pistons separating the two pressure chambers and the corresponding sliding portions of the cylinder housing are made longer by as much as a length corresponding to the worn quantity, thereby to keep the two pressure chambers oil-tight until the piston is disused. However, with such construction, the brake assembly cannot be made small enough to facilitate its installation into the narrow space provided in the vehicle or light enough to reduce the weight of its members being arranged under the spring device of the vehicle.

In order to shorten the length of the wheel cylinder, a construction has been provided in which each sliding portion of the piston and the cylinder housing is overlapped. But in this cylinder construction, the overlapped portion of the cylinder housing is formed separately from the main cylinder housing, so that it is necessary to provide sealing means therebetween. Such a cylinder, therefore, is difficult to construct or assemble, and is not economical.

SUMMARY OF THE INVENTION

Accordingly, it is an object of the present invention to provide a wheel cylinder in a dual hydraulic brake system of a vehicle which is shortened in its whole length by as much as a length corresponding to the worn quantity of a friction pad or a brake shoe lining.

It is another object of this invention to provide a wheel cylinder in which the number of sealing means for defining two pressure chambers are kept to a minimum.

A further object of this invention is to provide a wheel cylinder which is simple in construction and easy to assemble.

A still further object of this invention is to provide a wheel cylinder in which any air in the pressure chamber can be easily expelled out of the cylinder housing, thereby performing a reliable braking operation.

BRIEF DESCRIPTION OF THE DRAWINGS

Various other objects, features and attendant advantages of the present invention will be more fully appreciated as the same becomes better understood from the following detailed description, when considered in connection with the accompanying drawings, in which.

DETAILED DESCRIPTION OF THE INVENTION

Figure 1:
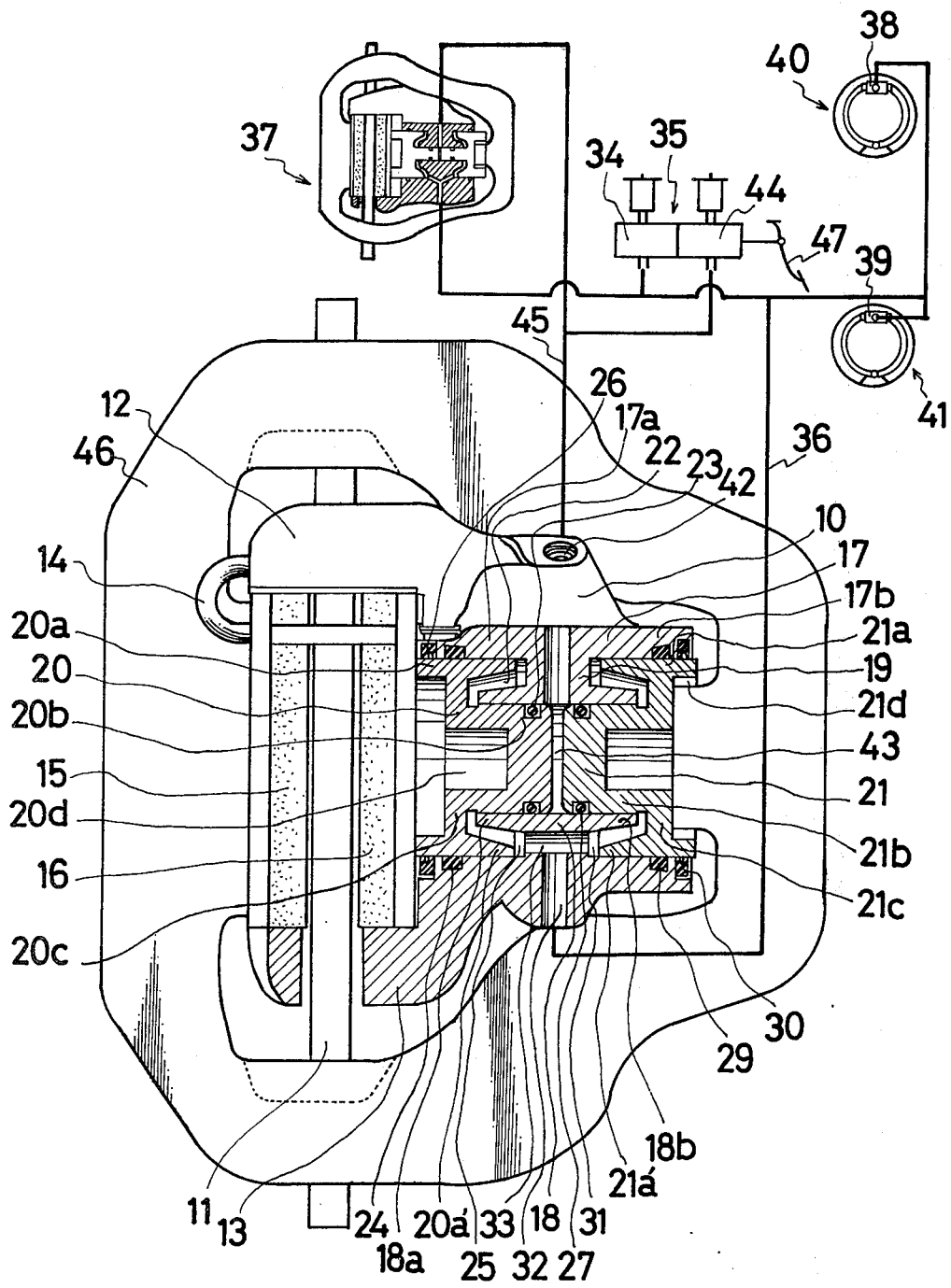
FIG. 1 is a partially sectional view of a wheel cylinder according to the present invention taken through the center of the wheel cylinder and illustrating the components of the wheel cylinder as they are in a retracted or brake-released position, the other hydraulic devices or hydraulic lines being shown in a relatively reduced scale, or schematically.

Referring now to the drawings and particularly to FIG. 1, a cylinder housing 10 for a spot disc brake is open at both ends and fixed to a stationary member, not shown, of the vehicle at one side of a rotatable brake disc 11. The cylinder housing 10 includes a pair of integral arms 12 and 13 radially separated from each other which extend over the outer periphery of the disc 11. A pair of parallel pins 14, although only one of which is shown in FIG. 1, is secured to the cylinder housing 10 for supporting friction pads 15 and 16 disposed on mutually opposite sides of the disc 11.

The cylinder housing 10 comprises a large diameter portion 17, a smaller diameter portion 18 radially inward thereof, and a neck portion 19 therebetween being formed integrally with the larger and smaller diameter portions. The larger diameter portion 17 is of the greatest axial length, while the neck portion 19 is of the smallest axial length. The larger diameter portion 17 comprises a left sleeve 17a and a right sleeve 17b, and the smaller diameter portion 18 similarly comprises a tapered left sleeve 18a and a tapered right sleeve 18b.

A pair of stepped pistons 20 and 21 is slidably fitted within the cylinder housing 10. The left piston 20 comprises a larger diameter portion 20a adapted for slidable contact with the left sleeve 17a of the cylinder housing 10, a smaller diameter portion 20b adapted for slidable contact within the left sleeve 18a, a neck portion 20c provided between the larger and smaller diameter piston portions 20a and 20b, and a stepped bore 20d. The larger diameter portion 20a of the left piston 20 also features a tapered inner sleeve 20a' which overlaps the tapered left sleeve 18a with a radial gap 22 being provided therebetween. A sealing ring 23 is fitted to the outer periphery of the smaller diameter 20b, and another seal 24 is fitted to the inner periphery of the left sleeve 17a of the housing 10, whereby the radial gap 22 and the axial gaps respectively formed between the neck portion 19 and the left end off the left sleeve 18a of the housing and the right end of the larger diameter portion 20a and the neck portion 20c of the piston constitute a left fluid chamber 25. It will be seen that according to the tapered construction, the air in the chamber 25 is easily expelled out of the housing 10. The numeral 26 represents a dust seal for preventing entrance of foreign material, such as dust, mud and water, into the left chamber 25.

In a similar manner, the right piston 21 comprises a larger diameter portion 21a provided with a tapered inner sleeve 21a' which overlaps the tapered right sleeve 18b of the housing 10, a smaller diameter portion 21b fitted with a sealing ring 27, a neck portion 21c, and a stepped bore 21d. Another sealing member 29 and a dust seal 30 are securely mounted to the inner periphery of the right sleeve 17b of the cylinder housing 10, thus providing a right fluid chamber 31.

The cylinder housing 10 further comprises a radial passage 32 formed in the larger diameter portion 17 thereof and an axial passage 33 formed in the neck portion 19 thereof for fluidically connecting the left and right chambers 25 and 31 and the radial passage 32. The radial passage 32 is in turn fluidically connected to one of the fluid chambers 34 of a tandem master cylinder 35 via a fluid piping 36. It will be seen that fluid under pressure generated in the one chamber 34 is supplied also to the other disk brake 37 and a pair of wheel cylinders 38 and 39 of the drum brakes 40 and 41 through the piping 36.

On the cylinder housing 10, there is also provided a radial passage 42 penetrating the larger diameter portion 17, the neck portion 19, and the smaller diameter portion 18. The passage 42 is fluidically connected both to an axial gap or a central chamber 43 provided between the left and right pistons 20 and 21 and to the other chamber 44 of the master cylinder 35 via a fluid piping 45. It will be seen that fluid under pressure generated in the other chamber 44 is supplied also to the other disc brake 37 through the piping 45. A closed ring-shaped plate 46 is supported by the pad 15 and the right piston 21 for transmitting the force from the piston 21 to the pad 15. An explanation about the other disc brake 37 and the drum brakes 40 and 41 will be omitted since the disc brake 37 is of the same construction as the above-explained disc brake, and the drum brakes 40 and 41 are of conventional design.

In operation, when a brake pedal 47 is depressed, pressurized fluid is supplied to the radial passages 32 and 43 independently. The fluid pressure admitted to the passage 32 is then imparted to the left and right chambers 25 and 31, while the fluid pressure admitted to the passage 42 is imparted to the central chamber 43, so that the two pistons 20 and 21 are urged to move in opposite directions thereby applying the friction pads 15 and 16 against the rotating brake disc 11. Upon hydraulic failure of either one of the fluid pipings 36 and 45, the pressurized fluid being supplied from the outer piping will still urge the pistons 20 and 21 to move oppositely, thereby applying the brake.

It will be understood that the relatively slidable portions of the cylinder housing and piston must be maintained in sealed relationship in order to maintain the two pressure chambers, i.e., the central chamber 43 and the left and right chambers 25 and 31, in oil-tight relationship as far as the friction pads 15 and 16 may wear within their usable range. In a conventional cylinder, the whole length of the cylinder becomes larger in size, whereas in a cylinder according to the invention the relatively slidable portions are overlapped so that the whole length of the cylinder can be made to be much shorter than in the conventional case. In addition, the larger diameter portion 17, the smaller diameter portion 18, and the neck portion 19 of the housing 10 are formed integrally with each other so that no sealing means need be provided therebetween.

Figure 2:
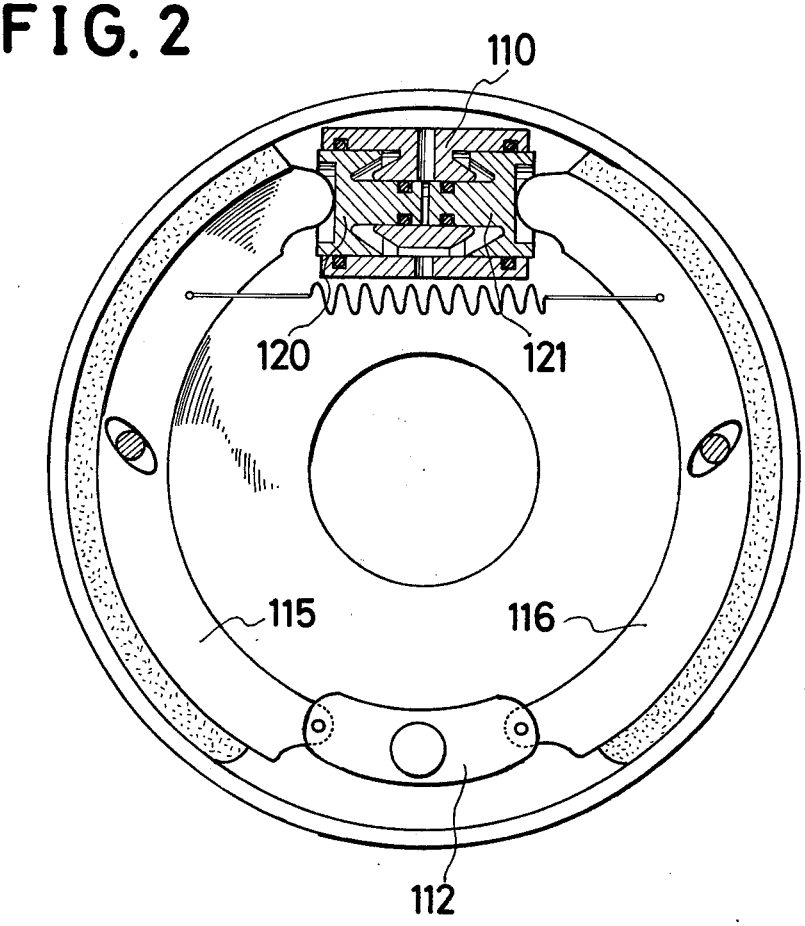
FIG. 2 is a view similar to FIG. 1, but showing another embodiment of a wheel cylinder of this invention, the other hydraulic devices or hydraulic lines being omitted.

FIG. 2 shows another embodiment of the invention wherein the cylinder adapted to the disc brake in the foregoing embodiment is utilized in a drum brake unit. Two stepped pistons 120 and 121 slidably fitted in a stationary cylinder housing 110 are made to abut with brake shoes 115 and 116, respectively. The lower and inner ends of the brake shoes 115 and 116 are pivotally received by a stationary anchor 112. The structure of the cylinder in this embodiment is similar to that of the previous embodiment and the construction of the drum brake unit is conventional, so that a complete detailed description thereof may be omitted.

Figure 3:
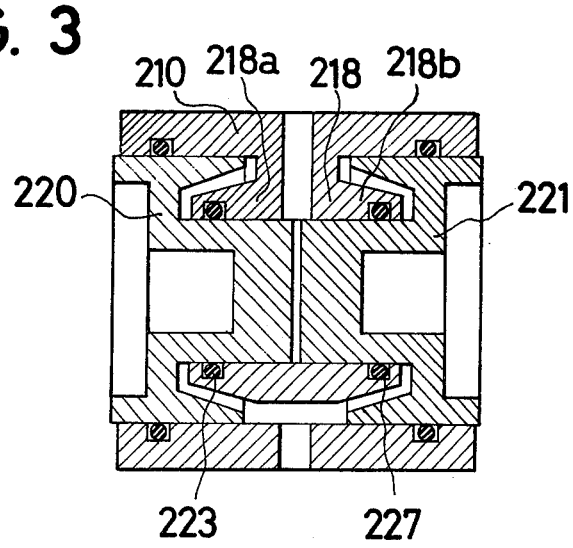
FIG. 3 is a sectional view of a further embodiment of a wheel cylinder constructed according to the present invention.

In a further modification illustrated in FIG. 3, two sealing rings 223 and 227 are fixedly mounted to the inner peripheral portions of left and right sleeves 218a and 218b of a housing 210, respectively, instead of on the outer peripheries of stepped pistons 220 and 221, as in the foregoing embodiments. Each sealing ring is disposed at the axially outermost position of each sleeve of the smaller diameter portion 218 of the housing 210. The remaining structure of the cylinder is similar to that of the aforementioned embodiment, so the description thereof will also be omitted.

Obviously many modifications and variations of the present invention are possible in light of the above teachings. It is to be understood, therefore, that within the scope of the appended claims, the invention may be practiced otherwise than as specifically described herein. Accordingly,

What is claimed as new and desired to be secured by Letters Patent of the U.S. is:

1. A wheel cylinder in a dual brake system, comprising;
    a cylinder housing open at its opposing axial ends and having an outer larger diameter portion and a radially inwardly disposed smaller diameter portion;
    two stepped pistons each having an outer larger diameter portion, the radially outer periphery of which is slidably engaged in sealed relation with the inner periphery of the larger diameter portion of the housing, and a radially inwardly disposed smaller diameter portion, the radially outer periphery of which is slidably engaged in sealed relation with the inner periphery of the smaller diameter portion of the housing;
    a first pressure chamber constituted between the smaller diameter portions of said two pistons and the inner periphery of the smaller diameter portion of said housing and being fluidically connected to a first pressure source; and
    a second pressure chamber constituted between each of said pistons and the housing and being fluidically connected to a second pressure source which is independent of the first pressure source;
    wherein the larger diameter portion of each piston includes a sleeve inwardly tapered on its radially inner surface, the smaller diameter portion of the housing includes a sleeve correspondingly outwardly tapered from each axial end thereof on its radially outward surface which overlaps the sleeve of each piston with an annular gap being provided therebetween, and the smaller diameter portion of the housing is formed integrally with the larger diameter portion thereof.

2. A wheel cylinder according to claim 1, wherein a sealing ring is fixedly mounted on the outer periphery of the smaller diameter portion of each piston.

3. A wheel cylinder according to claim 1, wherein a pair of sealing rings are fixedly mounted on the inner periphery of the smaller diameter portion of the cylinder housing.

4. A wheel cylinder according to claim 1, wherein each piston has a stepped bore formed therein.

5. A wheel cylinder according to claim 1, wherein one of the pistons is in abutment with a friction pad while the other piston is in abutment with a transfer member of a disc brake assembly.

6. A wheel cylinder according to claim 1, wherein each of the pistons is in abutment with a brake shoe of a drum brake assembly.

7. A wheel cylinder in a dual brake system, comprising:
- a cylinder housing open at its opposing axial ends and having an outer larger diameter portion, an integral neck portion extending radially inward from said larger diameter portion being of substantially less axial length than said larger diameter portion, and a radially inwardly disposed smaller diameter portion integrally formed with said neck portion and said larger diameter portion being of an axial length greater than said neck portion but less than said larger diameter portion, said neck portion and said smaller diameter portion being disposed substantially intermediate the axial length of said larger diameter portion, such that the smaller diameter portion has axial length in both directions from said neck portion;
- two stepped pistons each having an outer larger diameter portion the radially outer periphery of which is slidably engaged in sealed relation with the radially inner periphery of the larger diameter portion of said housing, respectively, between said outer larger diameter portion and said radially inwardly disposed smaller diameter portion of said housing on opposite sides of said neck portion of said housing, an integral neck portion, and a radially inwardly disposed smaller diameter portion integrally formed with said larger diameter portion and said neck portion of said piston and extending axially from one side of the neck portion for slidably being fitted within the smaller diameter portion of said housing with the radially outer periphery thereof being in sealed relation with the radially inner periphery of the smaller diameter portion of said housing, the radial extent of said larger diameter portion of each of said pistons being less than the radial spacing between said larger diameter portion and said smaller diameter portion of said housing as defined by said neck portion of said housing for providing a radial gap between the larger diameter portion of each of said pistons and the smaller diameter portion of said housing;
- a first pressure chamber constituted between said two pistons and the radially inner periphery of the smaller diameter portion of said housing and being fluidically connected to a first pressure source; and
- a second pressure chamber constituted between each of said pistons and said housing by said radial gaps and the axial spacing between inward ends of the larger diameter portions of each of said pistons and said neck portion of said housing and between outer ends of said smaller diameter portions of said housing and said neck portions of each of said pistons, said second pressure chamber being fluidically connected to a second pressure source which is independent of said first pressure source.

8. A wheel cylinder according to claim 7, wherein the radially inwardly disposed surface of said outer diameter portion of each of said pistons is inwardly tapered and the radially outwardly disposed surface of the smaller diameter portion of said housing extending axially from said neck portion thereof is correspondingly outwardly tapered.

* * * * *